United States Patent
Grove

(10) Patent No.: US 7,461,820 B2
(45) Date of Patent: Dec. 9, 2008

(54) AEROFOIL ARRANGEMENT

(76) Inventor: Graham Bond Grove, 18 Upoko Road, Hataitai, Wellington (NZ)

(*) Notice: Subject to any disclaimer, the term of this patent is extended or adjusted under 35 U.S.C. 154(b) by 278 days.

(21) Appl. No.: 10/477,257

(22) PCT Filed: May 9, 2002

(86) PCT No.: PCT/NZ02/00090

§ 371 (c)(1),
(2), (4) Date: Jun. 17, 2004

(87) PCT Pub. No.: WO02/092428

PCT Pub. Date: Nov. 21, 2002

(65) Prior Publication Data

US 2004/0253116 A1    Dec. 16, 2004

(30) Foreign Application Priority Data

May 11, 2001    (NZ) .................................... 511661

(51) Int. Cl.
*B64C 3/44* (2006.01)

(52) U.S. Cl. .................. 244/219; 244/207; 416/240; 416/DIG. 5

(58) Field of Classification Search .......... 244/198, 244/200, 201, 204, 207, 219; 416/DIG. 5, 416/240

See application file for complete search history.

(56) References Cited

U.S. PATENT DOCUMENTS

| | | |
|---|---|---|
| 1,879,717 A | 9/1932 | Sikorsky |
| 1,903,818 A | 4/1933 | Jutting |
| 2,041,793 A | 5/1936 | Stalker |
| 2,084,464 A | 6/1937 | Stalker |
| 2,437,318 A * | 3/1948 | Field ................ 244/134 B |
| 2,437,732 A * | 3/1948 | Ferrel ................ 244/12.1 |
| 2,638,990 A | 5/1953 | Pitcairn |
| 2,650,666 A | 9/1953 | Dorand et al. |
| 2,873,931 A | 2/1959 | Fleischmann |
| 2,912,189 A | 11/1959 | Pouit |
| 2,973,922 A | 3/1961 | Davidson |
| 3,058,695 A | 10/1962 | Simonis |

(Continued)

FOREIGN PATENT DOCUMENTS

DE    584585    9/1933

(Continued)

OTHER PUBLICATIONS

D.G. Hurley, "The use of Boundary Layer Control to Establish Free Stream-Line Flows," edited by G. Lachman, Pergamon Press, 1961, pp. 294-340.

*Primary Examiner*—Bret Hayes
*Assistant Examiner*—Benjamin P Lee
(74) *Attorney, Agent, or Firm*—Dann, Dorfman, Herrell and Skillman, P.C.

(57) ABSTRACT

Upper surface (13) of an aerofoil (or rotor blade) is provided with nozzles or slots (14, 16) at leading portion (15) and trailing portion (17) to assist attachment of airflow by discharging gas towards trailing edge (11). Gas discharged may be heated, eg coming from rocket-type combustion chambers within the aerofoil. The aerofoil may be adjustable between high profile (as shown) and low profile (for supersonic flight) using jacks that pivot sections of upper surface (13) at leading and trailing edges (10-11).

42 Claims, 10 Drawing Sheets

U.S. PATENT DOCUMENTS

| | | | |
|---|---|---|---|
| 3,058,696 A | 10/1962 | Culpepper | |
| 3,063,658 A | 11/1962 | Griswold, II | |
| 3,064,927 A | 11/1962 | Chaplin, Jr. | |
| 3,142,457 A | 7/1964 | Quenzler | |
| 3,184,185 A | 5/1965 | Brocard | |
| 3,261,576 A | 7/1966 | Valyi | |
| 3,275,266 A | 9/1966 | Cockerell | |
| 3,276,727 A | 10/1966 | Clark | |
| 3,332,383 A * | 7/1967 | Wright | 114/39.31 |
| 3,350,036 A | 10/1967 | Lemoigne | |
| 3,361,386 A | 1/1968 | Smith | |
| 3,507,463 A | 4/1970 | Kuntz | |
| 3,614,260 A * | 10/1971 | Ellinger | 416/23 |
| 3,770,227 A | 11/1973 | von Ohain et al. | |
| 3,774,864 A * | 11/1973 | Hurkamp | 244/13 |
| 3,794,137 A * | 2/1974 | Teodorescu et al. | 181/256 |
| 3,820,628 A | 6/1974 | Hanson | |
| 3,873,233 A | 3/1975 | Linck | |
| 3,887,146 A | 6/1975 | Bright | |
| 3,889,903 A | 6/1975 | Hilby | |
| 3,917,193 A | 11/1975 | Runnels, Jr. | |
| 3,920,203 A | 11/1975 | Moorehead | |
| 4,019,696 A | 4/1977 | Hirt et al. | |
| 4,099,691 A | 7/1978 | Swanson et al. | |
| 4,117,995 A | 10/1978 | Runge | |
| 4,146,197 A | 3/1979 | Grotz | |
| 4,296,900 A * | 10/1981 | Krall | 244/219 |
| 4,326,686 A | 4/1982 | Runge | |
| 4,341,176 A * | 7/1982 | Orrison | 114/102.22 |
| 4,351,502 A * | 9/1982 | Statkus | 244/219 |
| 4,391,424 A | 7/1983 | Bartoe, Jr. | |
| 4,406,433 A | 9/1983 | Radkey et al. | |
| 4,447,027 A | 5/1984 | Wang | |
| 4,447,028 A | 5/1984 | Wang | |
| 4,583,704 A | 4/1986 | Krauss et al. | |
| 4,626,171 A | 12/1986 | Carter, Sr. et al. | |
| 4,770,607 A | 9/1988 | Cycon et al. | |
| 4,962,903 A * | 10/1990 | Byron | 244/117 A |
| 4,966,526 A | 10/1990 | Amelio et al. | |
| 5,016,837 A | 5/1991 | Willis | |
| 5,054,721 A | 10/1991 | Brenholt | |
| 5,181,678 A * | 1/1993 | Widnall et al. | 244/219 |
| 5,314,301 A * | 5/1994 | Knight | 415/160 |
| 5,813,625 A | 9/1998 | Hassan et al. | |
| 5,899,416 A | 5/1999 | Meister et al. | |
| 6,045,096 A * | 4/2000 | Rinn et al. | 244/219 |
| 6,485,590 B1 * | 11/2002 | Ivkovich, Jr. et al. | 156/89.11 |
| 6,709,239 B2 * | 3/2004 | Chandraker | 416/238 |
| 6,910,662 B1 * | 6/2005 | Ofner | 244/219 |
| 6,979,178 B2 * | 12/2005 | Chandraker | 416/223 A |
| 7,070,392 B2 * | 7/2006 | Bradbury et al. | 416/243 |
| 7,179,058 B2 * | 2/2007 | Chandraker | 416/223 A |
| 2003/0231961 A1 * | 12/2003 | Chandraker | 416/243 |
| 2006/0027711 A1 * | 2/2006 | Boldrin et al. | 244/204 |
| 2006/0157623 A1 * | 7/2006 | Voglsinger et al. | 244/219 |

FOREIGN PATENT DOCUMENTS

| | | |
|---|---|---|
| DE | 662426 | 7/1938 |
| DE | 729949 | 1/1943 |
| DE | 767314 | 5/1952 |
| DE | 940509 | 5/1956 |
| EP | 0068737 | 1/1983 |
| EP | 0078245 | 5/1983 |
| EP | 0230684 | 8/1987 |
| EP | 0776821 | 6/1997 |
| FR | 681121 | 5/1930 |
| FR | 940882 | 12/1948 |
| FR | 1010361 | 6/1952 |
| FR | 1253801 | 1/1961 |
| GB | 228637 | 2/1925 |
| GB | 404166 | 1/1934 |
| GB | 518663 | 4/1949 |
| GB | 998895 | 7/1965 |
| GB | 1465412 | 2/1977 |
| GB | 2030674 | 4/1980 |
| GB | 1600454 | 10/1981 |
| GB | 2084690 | 4/1982 |
| GB | 2203710 | 10/1988 |
| GB | 2224096 | 4/1990 |
| GB | 2236293 | 4/1991 |
| GB | 2264475 | 9/1993 |
| GB | 2296306 | 6/1996 |
| WO | WO 92 21560 | 12/1992 |

* cited by examiner

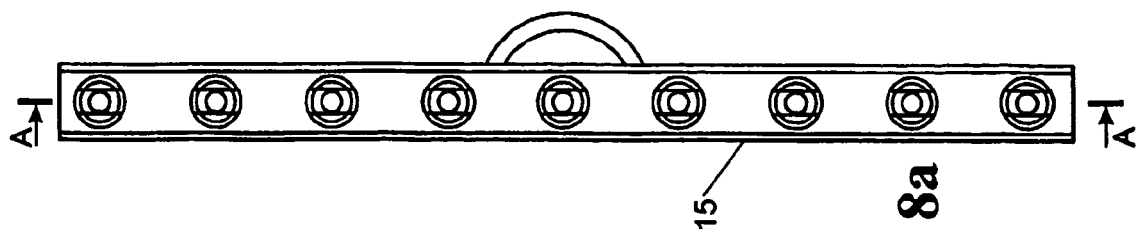
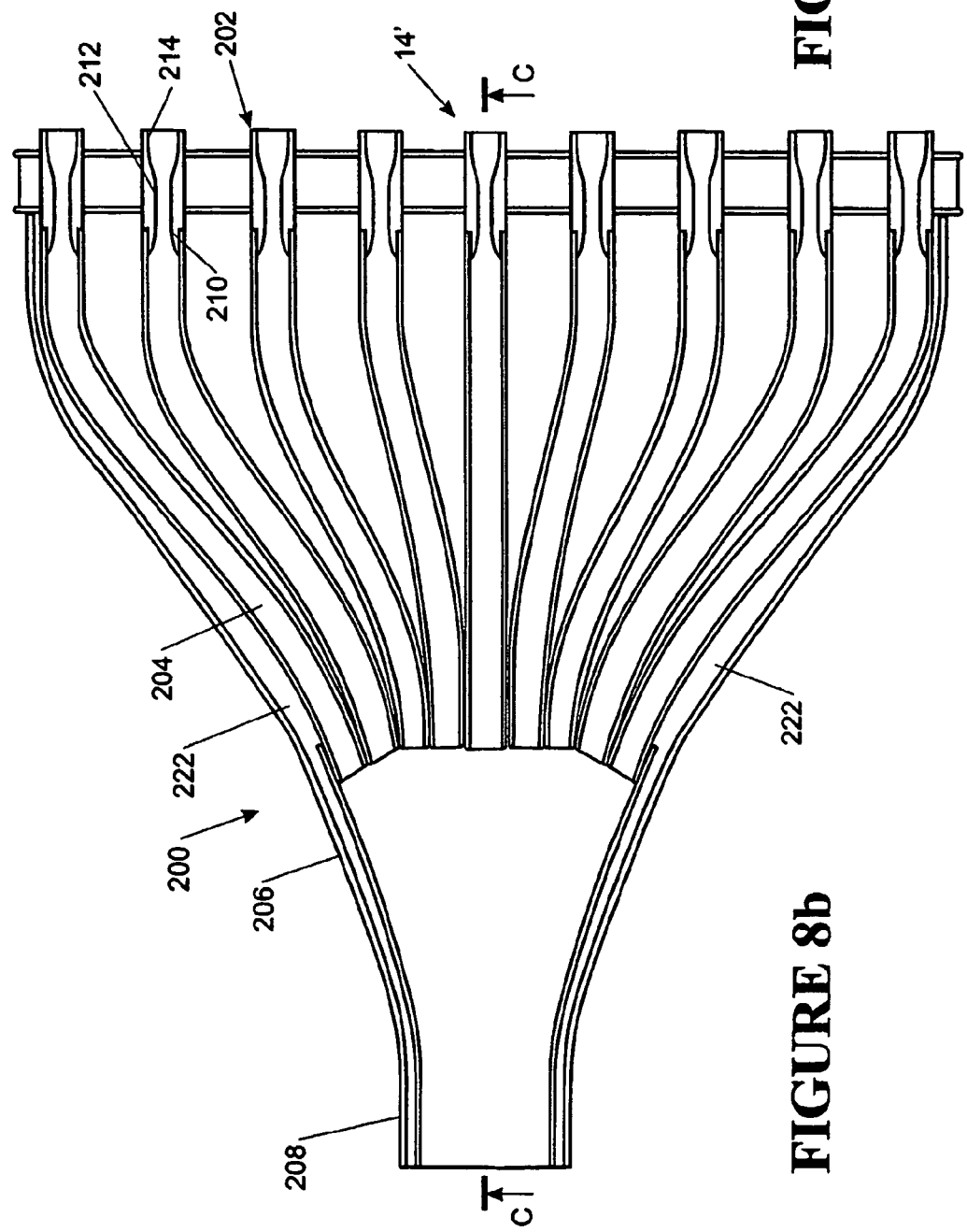
FIGURE 8a
FIGURE 8b

AEROFOIL ARRANGEMENT

FIELD OF THE INVENTION

This invention relates to a high lift aerofoil with improved lift and drag characteristics, in particular but not solely to aerofoils for rotors in vertical takeoff and landing (VTOL) and short takeoff and landing (STOL) aircraft, and to aerofoils which may be used as wings for aircraft.

It is the result of an investigation into vorticity, involving trapped vortexes, vortex generators and finally a bound vortex situation.

BACKGROUND

The airflow around an aerofoil having a sharp leading edge tends to separate at the leading edge and breakaway over the upper aerofoil surface, depending on angle of attack. Various means have been used to reattach airflow over these aerofoils, and reduce the breakaway flows which generally decrease lift and increase drag.

It is an object of the present invention to provide an aerofoil with enhanced attachment of airflow for rotors such as for VTOL aircraft, or for use on other types of aircraft wings, such as for STOL, supersonic or hypersonic type aircraft, or to at least provide the public with a useful choice.

SUMMARY OF THE INVENTION

In accordance with a first aspect of the present invention there is provided an aerofoil having upper and lower surfaces, leading and trailing edges, and least one opening provided along a leading portion of the upper surface to discharge gas away from the leading edge and assist attachment of airflow over the upper surface.

The opening may be in the form of a slot, or a series of longitudinally aligned apertures or nozzles. In a preferred form of the invention, there is a series of spaced apertures or nozzles arranged linearly along the leading portion of the upper surface.

Preferably, an opening in the form of a slot or a series of spaced apertures or nozzles is also provided along a region of the upper surface between the first mentioned opening(s) and a trailing surface portion of the upper surface, to discharge gas towards the trailing edge and further assist the attachment of airflow over the upper surface. The gas may be heated, perhaps by means to heat the gas, which may be a combustion chamber within the aerofoil itself, or adjacent to the aerofoil but in operable connection with the aerofoil.

The apertures or nozzles are preferably arranged to disperse the gas over the surface of the aerofoil. The apertures or nozzles may include substantially V-shaped notches in their side walls. Alternatively, the width of the outlet of each nozzle or aperture may be greater than its height.

The aerofoil may be part of a rotor, or may be a wing.

In accordance with a second aspect of the present invention, there is provided a rotor assembly including: a central support; a rotor including a plurality of radially oriented aerofoils distributed circumferentially around the central support; and gas supply means which carries pressurised gas from the central support to the aerofoils; at least a majority of the aerofoils having a leading edge, a leading upper surface portion, and at least one opening extending outwards along the leading upper surface portion to discharge gas from the supply means over the upper surface away from the leading edge.

The opening may be in the form of a slot, or a series of spaced apertures or nozzles may be provided. The spaced apertures may be linearly arranged along the leading portion of the upper surface.

Each of the aerofoils is preferably inclined to oncoming airflow at an angle of about 22° or more, depending on the size of the aerofoil. A larger aerofoil may be inclined at a greater angle.

Inlet guide vanes may be arranged about the periphery of the rotor to direct oncoming airflow to the aerofoils. The guide vanes are preferably arranged at an angle to a radius of the rotor and are arranged to extend outwardly defining a direction of rotation of the rotor. Each guide vane preferably extends at an angle of about 53° to the radius of the rotor, from the central axis of the rotor to intersect with an inner edge of the associated guide vane. Each guide vane may also be oriented at an angle to the axis of rotation of the rotor. Preferably, each guide vane is oriented at an angle of about 45° to the axis of rotation of the rotor.

Preferably a ceiling is provided over the guide vanes which is adapted to cause the airflow to enter through the guide vanes.

At least a majority of the aerofoils may include at least one further opening a long a region of the upper surface between the opening(s) along the leading portion of the upper surface and a trailing portion of the upper surface, to discharge gas towards the trailing edge.

In accordance with a third aspect of the present invention, there is provided an aerofoil having upper and lower surfaces, and leading and trailing edges, at least one opening provided along a leading portion of the upper surface to discharge gas away from the leading edge and assist attachment of airflow over the upper surface, the aerofoil being adjustable between a high profile configuration and a low profile configuration.

The opening may be in the form of a slot, or the openings may comprise a series of apertures or nozzles spaced along the leading portion of the upper surface. The plurality of apertures or nozzles is preferably arranged linearly.

Preferably, the apertures or nozzles are arranged to disperse the gas over the surface of the aerofoil. The apertures or nozzles may include substantially V-shaped apertures in their side walls. The width of the outlet of each nozzle or aperture may be greater than its height.

The upper surface is preferably constituted by a leading surface portion. Preferably, the upper leading surface portion is constituted by an upper leading panel and the upper trailing surface portion is constituted by an upper trailing panel.

The upper trailing panel may be detachably joined to the remainder of the upper surface to facilitate movement between the high profile configuration and the low profile configuration. The detachable joint is preferably in the form of a sliding lap joint. The sliding lap joint suitably includes a roller rotatably mounted to the upper trailing panel which is slidable in a curved channel extending from the upper leading panel.

The lower surface is preferably defined by a leading panel, a central panel, and a trailing panel. The lower leading panel and the lower trailing panel may be hingedly connected to the lower central panel. The lower central panel preferably includes a transverse bend which defines a lower central panel leading portion and a lower central panel trailing portion. In a preferred embodiment, the upper leading panel is fixedly attached to the lower leading panel at the leading edge, and the upper trailing panel is fixedly attached to the lower trailing panel at the trailing edge. The lengths of the lower leading panel and the lower trailing panel may be significantly less than the length of the lower central panel.

The aerofoil preferably includes two internal hydraulic jacks extending from adjacent to the lower surface to adjacent the upper surface to facilitate adjustment between the low profile configuration and the high profile configuration. The aerofoil may include two main structural supporting beams. A hydraulic jack may extend between each structural supporting beam and a respective upper panel of the aerofoil.

The leading edge of the aerofoil is preferably rounded. The rounded leading edge may include a section through which cooling fluid or gas may pass to cool the leading edge. The section may be in the form of a pipe. The portion of the aerofoil adjacent to and including the leading edge may include a high temperature resistant layer. The high temperature resistant layer suitably comprises a ceramic material.

The aerofoil preferably includes means to heat the gas, which may comprise a combustion chamber within the aerofoil. A rocket chamber may be provided within the aerofoil which is arranged to exhaust heated gas to the opening(s). Preferably, the openings comprise a plurality of nozzles, and an arrangement is provided to exhaust heated gas from the rocket chamber to at least some of the plurality of nozzles. Alternatively, one or more rocket chambers may be provided with each opening comprising part of a respective rocket chamber.

The means to heat the gas may be provided adjacent to, but in operable connection with, the aerofoil.

At least one further opening may be provided along a region of the upper surface between the opening(s) along the leading portion of the upper surface and a trailing surface portion of the upper surface, to discharge gas towards the trailing edge and further assist the attachment of airflow over the upper surface.

Preferably, the opening in the trailing surface portion is in the form of a slot. Alternatively, the openings in the trailing surface portion comprise a plurality of apertures or nozzles arranged along the trailing surface portion of the upper surface. The plurality of apertures or nozzles is preferably arranged linearly.

Preferably the apertures or nozzles in the trailing surface portion are arranged to disperse the gas over the trailing surface portion of the aerofoil. The apertures or nozzles in the trailing surface portion may include substantially V-shaped apertures in their side walls. The width of the outlet of each aperture or nozzle in the trailing surface portion may be greater than its height.

The aerofoil is preferably a wing. In a preferred embodiment, the aerofoil is movably attached to an aircraft so that its angle of incidence to oncoming airflow is selectively variable.

The invention may also broadly be said to consist in any alternative combination of parts or features here referred to or shown in the accompanying drawings. Known equivalents of these parts or features not expressly set out are nevertheless to be included.

BRIEF DESCRIPTION OF THE DRAWINGS

In order that the invention may be more fully understood, an example will be described with reference to the accompanying drawings of which.

DETAILED DESCRIPTION OF PREFERRED FORMS

An aerofoil having gas discharge slots according to the invention has been found to provide a marked increase in lift and forward thrust. The gas is typically heated and/or compressed air, but other gases under a range of conditions may also be used.

Figure 1:
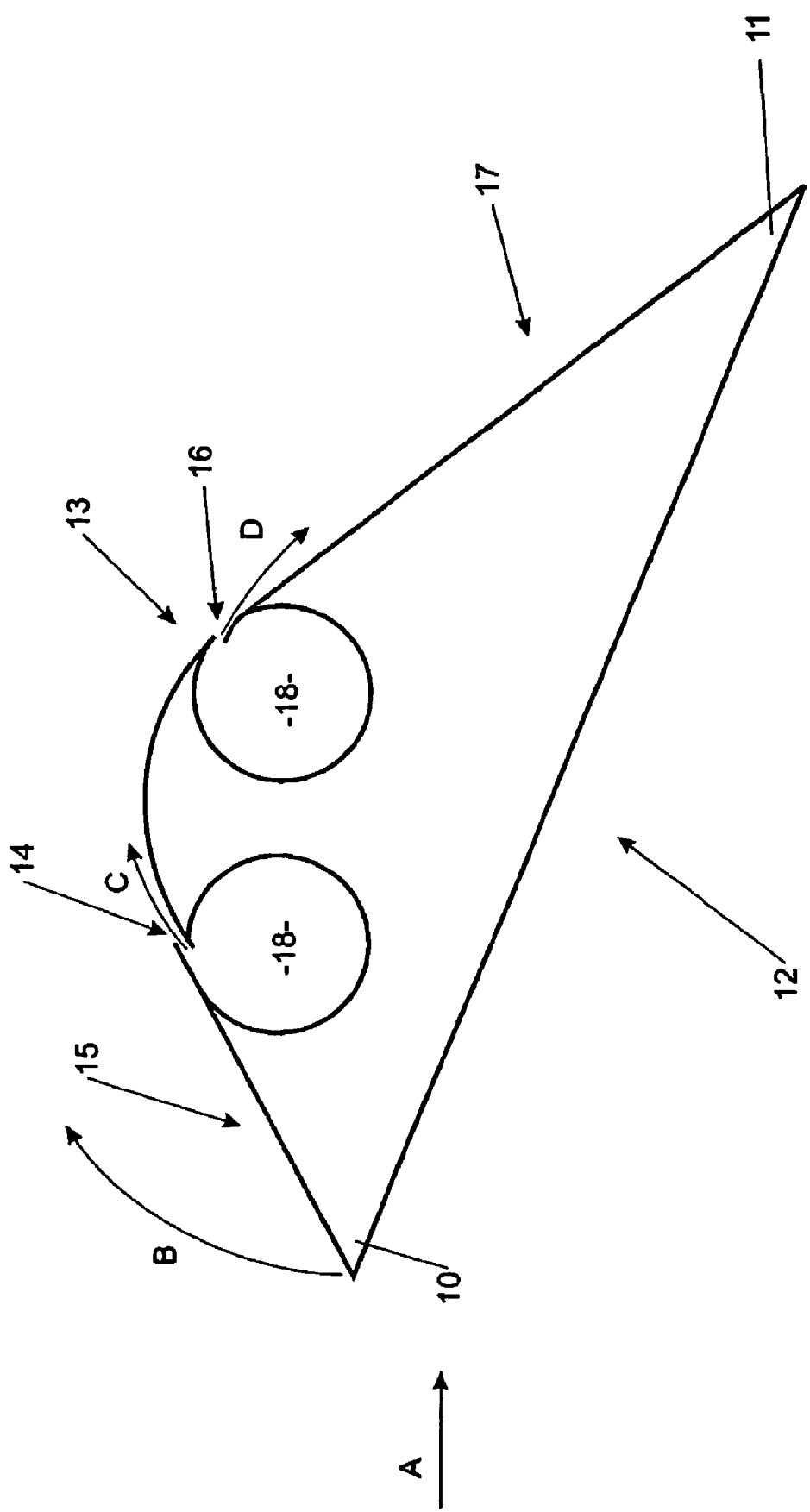
FIG. 1 shows an aerofoil according to a preferred embodiment of the invention in simplified cross-section.

FIG. 1 shows a prototype aerofoil in simplified cross-section or profile. Externally the aerofoil has sharp leading and trailing edges 10, 11 and lower and upper surfaces 12, 13 respectively. A gas discharge slot 14 lies along the aerofoil, approximately perpendicular to the profile, in a leading portion 15 of the upper surface 13. Another slot 16 lies rearwardly of the slot 14 beyond a curved portion of the upper surface in a region between the leading portion and a trailing portion 17, at or near a position of maximum thickness of the aerofoil. Most internal details have been omitted for clarity except chambers 18, each of which may be a single large chamber, through which gas reaches the slots. It will be appreciated that the discharge pressure from each slot will be determined by the flow rate (measured for example in units CFM) of gas into the respective chamber 18 as well as the geometry of the discharge slots.

Arrow A in FIG. 1 indicates a typical direction of airflow towards the aerofoil in use.

Arrow B indicates the leading edge breakaway flow. This is mainly due to pressure differences and the conservation of angular momentum. The flow from just underneath the leading edge 10 increases in pressure and flows back around the leading edge, giving a powerful leading edge breakaway flow.

Arrows C and D indicate gas blown from the slots. This blowing creates a Coanda flow which reattaches the leading edge breakaway flow to the aerofoil.

A feature of this aerofoil is to take advantage of the power of the leading edge breakaway flow. The actual aerodynamic mechanism involved is complex.

Figure 2:
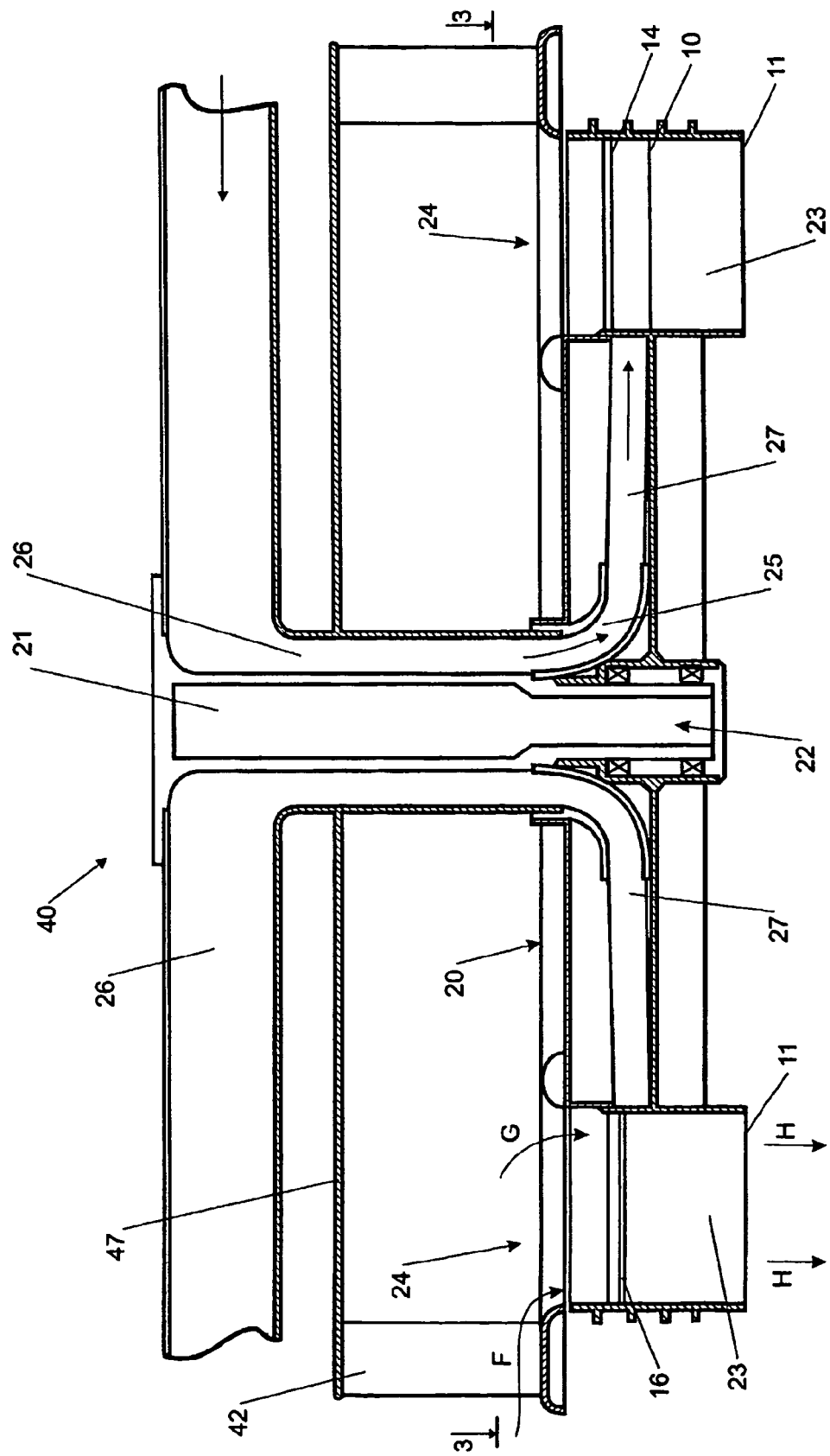
FIG. 2 shows a rotor according to a preferred embodiment of the invention in simplified elevational cross-section.

FIG. 2 is a simplified vertical cross-section through a rotor assembly 40 for a VTOL aircraft. The rotor includes aerofoils according to the invention, such as those shown in FIG. 1. The rotor 20 is mounted on a central support 21 through bearings 22. Aerofoils 23 are shown mounted within a single duct 24 around the circumference of the rotor. Pressurised hot air is supplied to a manifold on the rotor through fixed ducts 26 on the support and from there to individual aerofoils through tubes 27, which rotate with the aerofoils 23 on the bearings 22.

An auxiliary engine may be provided to supply the compressed air. Alternatively, the area containing tubes 27 could also contain an air compressor, driven by the main engines. The tubes 27 could be replaced with a combustion zone. Alternatively the tubes 27 may carry rocket fuel, such as kerosene and hydrogen peroxide, with combustion taking place in the chambers 18, or within the aerofoil and adjoining chambers 18.

Figure 3:
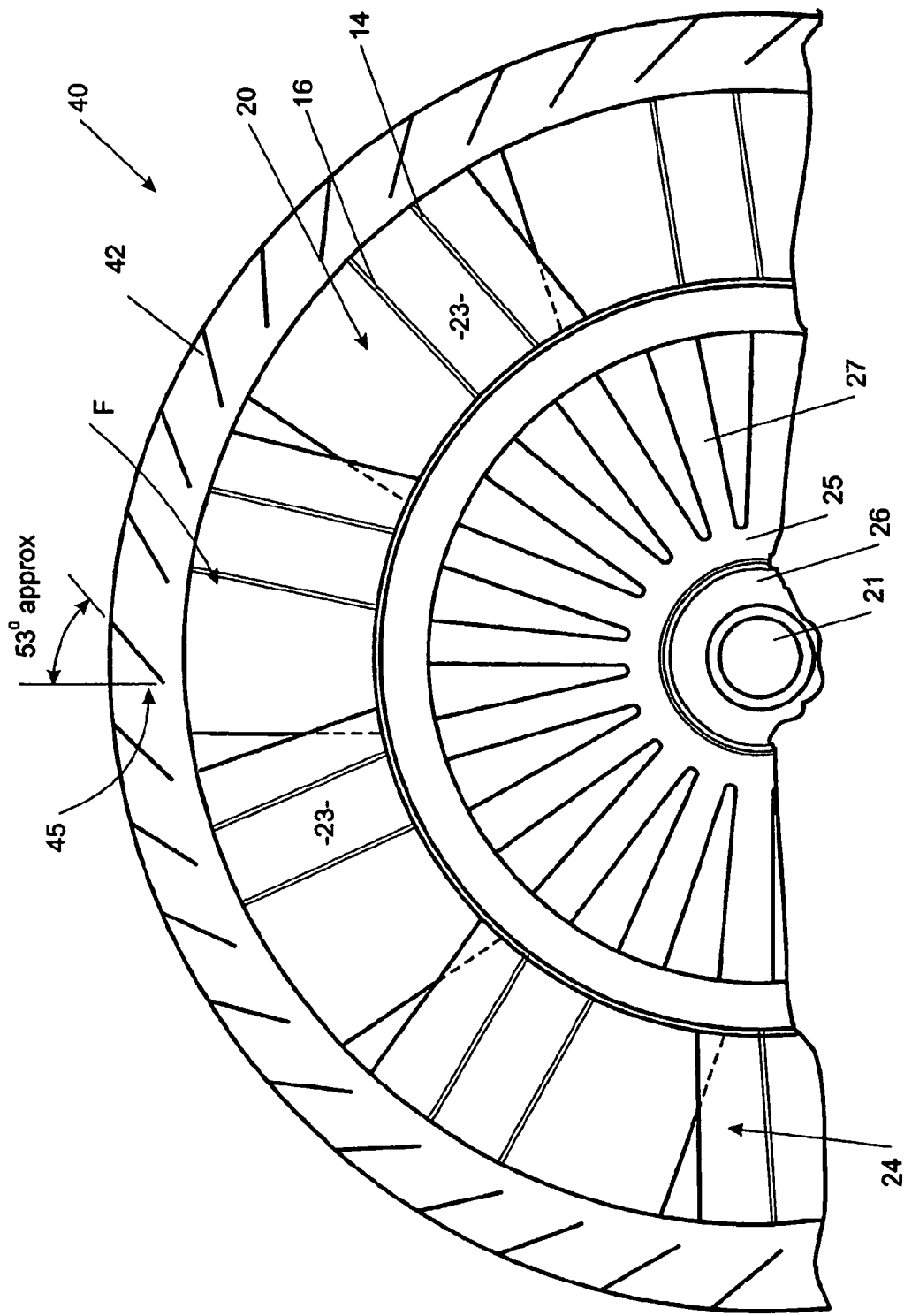
FIG. 3 is a partial plan view of the rotor of FIG. 2 along line 3-3.

FIG. 3 is a simplified plan view of the rotor along line 3-3 of FIG. 2, showing the aerofoils 23 oriented approximately radially for clockwise rotation overall. Again the aerofoils are shown only in outline with areas of overlap indicated by dashed lines on their trailing edges. Each is inclined to its oncoming airflow at approximately 22° as shown in FIG. 1. An optimum angle of about 26° has been determined for a small size of aerofoil. Angles of greater than about 22° are suitable, with higher angles being particularly suitable for larger aerofoils. The radius of the curved portion of the upper surface of the aerofoil determines the angle of incidence to oncoming air at which the aerofoil will stall (at a given air velocity). The angle of incidence of a larger aerofoil having a larger radius of curvature may be greater without stalling. Forward or backward sweeping aerofoils are also a possibility, as has been determined from tests carried out.

As shown in FIGS. 2 and 3, the rotor assembly 40 also includes fixed inlet guide vanes 42.

The inlet guide vanes 42 are spaced about the periphery of the rotor assembly 40 as can be most clearly seen from FIG. 3. The guide vanes 42 are arranged at an angle of about 53° to a radius of the rotor extending from the central axis of the rotor to intersect with the inner edge 45 of the associated guide vane 42. From the inner edge 45 to the outer edge, the guide vanes 42 are arranged to extend outwardly in the same direction as the rotation of the rotor, in this case clockwise. Although not shown, each guide vane 42 could also extend at an angle to the axis of rotation of the rotor, more preferably at about 45°, to provide additional lift.

The arrangement illustrated in FIG. 2 includes a ceiling 47, which is fixed to the ducts 26 and guide vanes 42. Arrows F, G and H illustrate the direction of the air flow through the rotor 20. The ceiling 47 causes the airflow to enter through the inlet guide vanes 42 forming a vortex flow in the opposite direction to the direction of rotation of the rotor, increasing lift.

The upper portion of the rotor assembly 40 including the support 21, ducts 26, ceiling 47 and inlet guide vanes 42 are stationary. The lower portion of the rotor assembly 40 including the rotor 20, tubes 27, duct 24 and aerofoils 23 rotate about the bearings 22 on the support 21.

The results from a rotating test rig made in accordance with the embodiment of FIGS. 2 and 3 show a coefficient of lift of up to 8 for various useful aerofoil velocities.

Tests have shown a favourable hovercraft ground effect can exist under the rotors giving up to 50% more lift.

A range of small scale aerofoils have been tested according to the shape of FIG. 1. Good results were obtained for a model about 15 cm in chord length (i.e. length from leading edge to trailing edge) where the leading and trailing edges were formed with internal angles of approximately 50° and 30° respectively. The distance from the leading edge to the first slot 14 was about one third the chord length of the aerofoil while a curved surface between the slots had a radius of about one quarter this chord length. Slightly concave lower surfaces and different blowing slot widths and arrangements are possible. Wind tunnel tests have also shown that as the chord length is increased, a proportional increase in lift may be obtained without requiring an increase in flow rate of compressed gas into the chambers 18.

The nature of the molecular interaction between the breakaway flow B which separates from the leading edge of an aerofoil and the air or gas C which is blown out of the leading slot is not entirely clear. Air or gas from the discharge slot follows the curved upper surface 13 quite closely according to the Coanda effect. A part of the breakaway flow is entrained to reduce pressure over the leading portion of the upper surface with a consequent increase in lift and forward thrust. The trailing slot has a similar effect, of flow reattachment and increased lift. As the gas passes through the aerofoils it also drives them forward.

Overall the gas discharge slots are believed to have a threefold effect. Reattachment of the airflow increases lift and forward thrust on each aerofoil, while jet reaction from the discharged air or gas assists to propel them. To prevent blowing blockage through the narrow discharge slots, they can be replaced with spaced nozzles of say about 3/16" (4.76 mm) to about 5/16" (8 mm) diameter. The nozzles may have substantially V-shaped notches in their walls as will be described below. The geometry of the aerofoil allows for a strong lightweight structure, as is required. This should provide a substantial encouragement to further development of VTOL and STOL aircraft.

Figure 4:
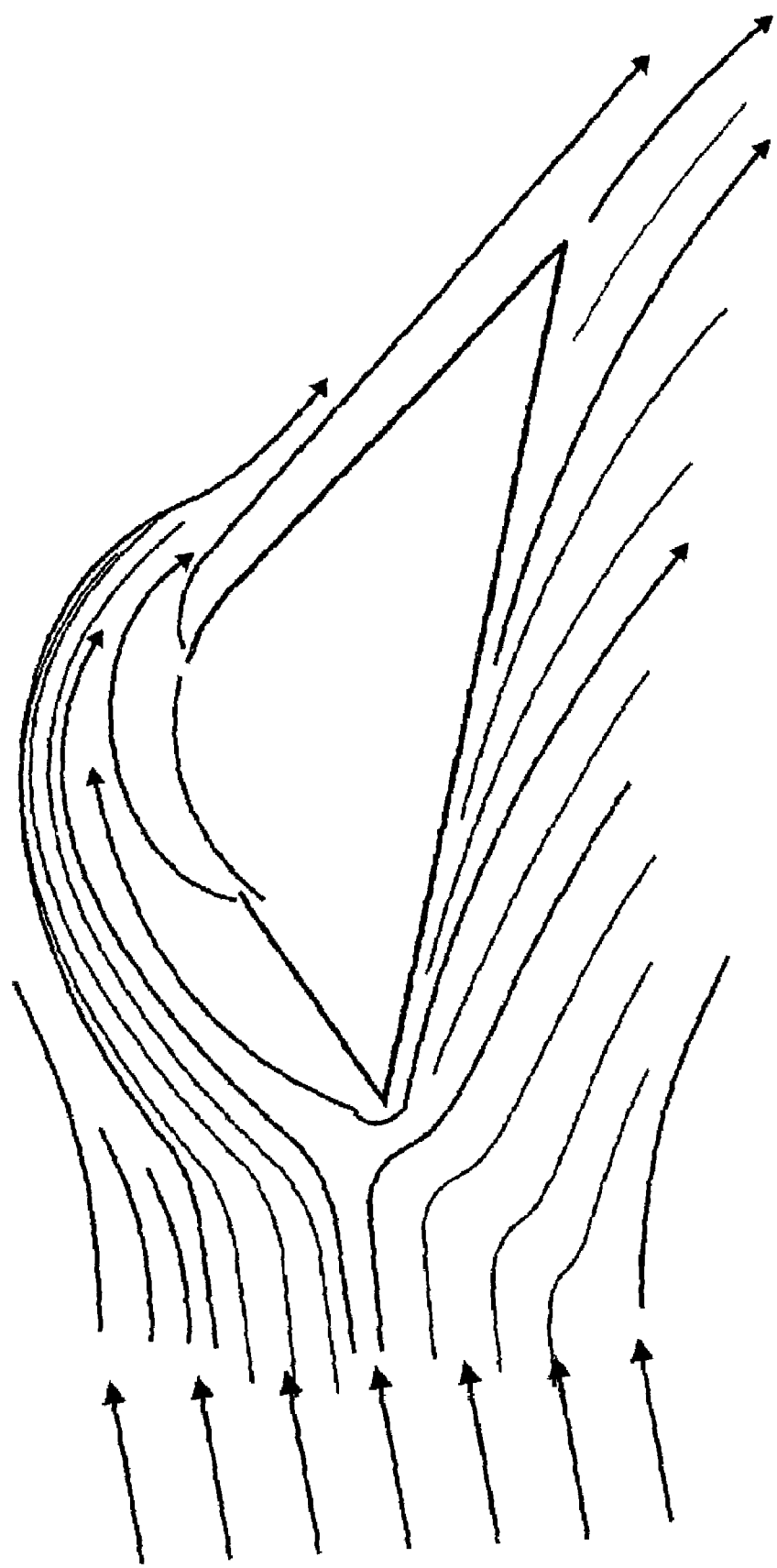
FIG. 4 illustrates the flow over the aerofoil of a preferred embodiment of the invention in a test situation.

FIG. 4 illustrates the flow over the aerofoil in a test situation. The test was performed by the use of an aerofoil segment having the cross-section as illustrated in the figure. The segment is fixed between two plates at either end of the segment. The plates extend parallel to the cross-section of the aerofoil segment. Air is forced to flow out of a nozzle over the aerofoil segment. With the use of paint and oil provided on one of the end plates, the flow over the aerofoil segment produces the flow pattern illustrated in the figure.

Figure 5:
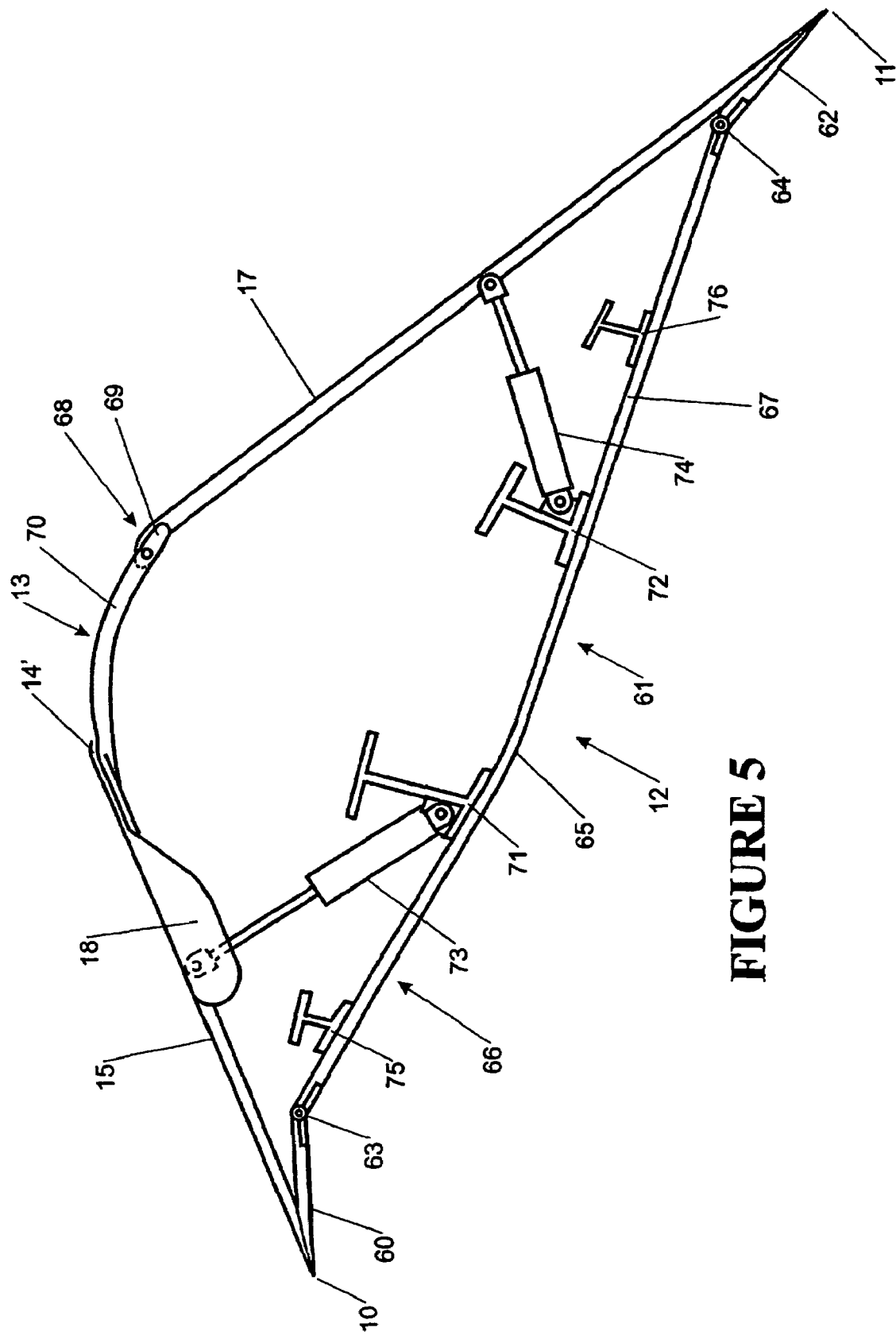
FIG. 5 shows a simplified cross-section of an aerofoil according to an alternative embodiment of the invention, the aerofoil being in a high profile configuration.
Figure 6:
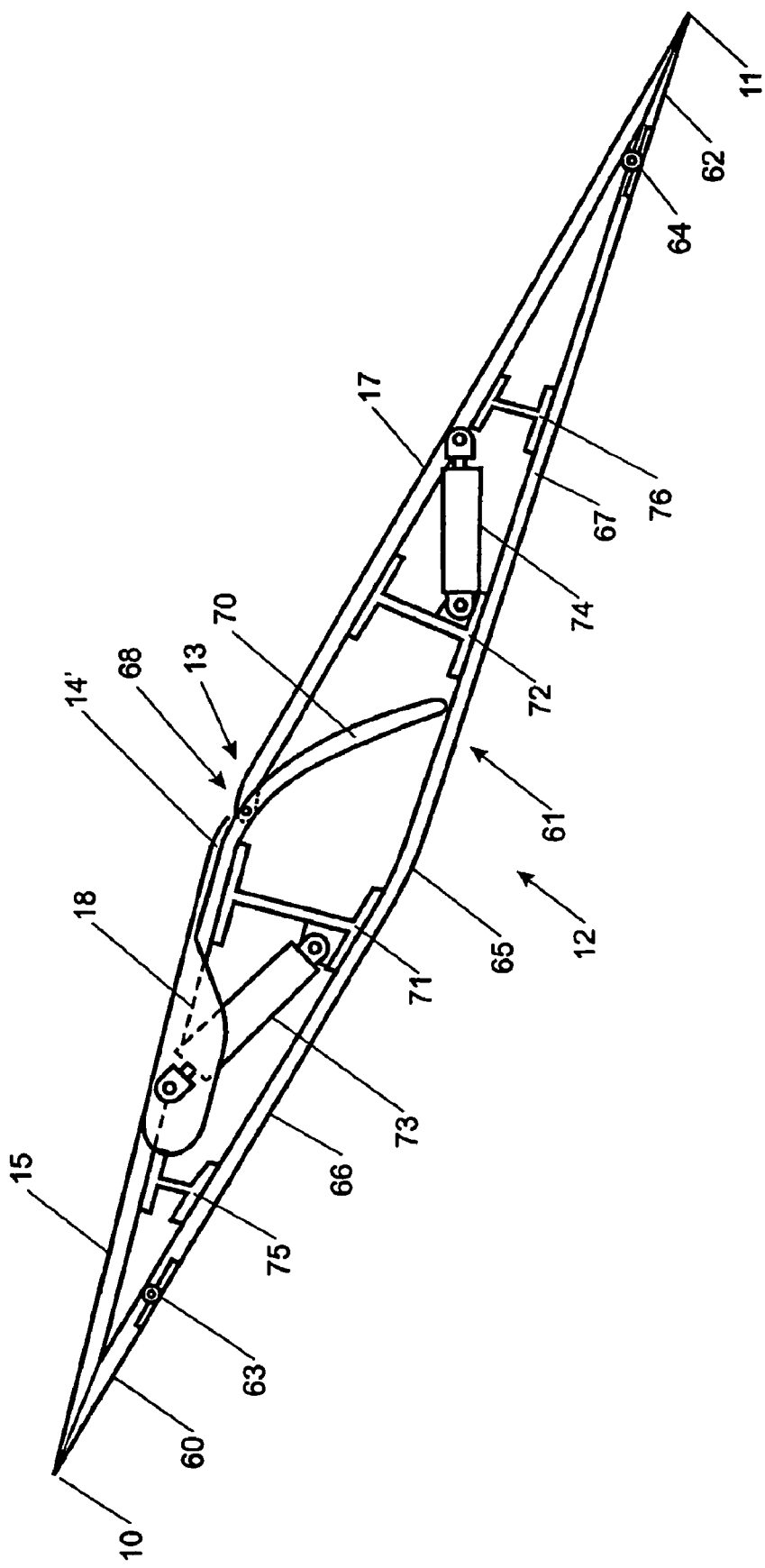
FIG. 6 shows the aerofoil of FIG. 5 in a low profile configuration.

FIGS. 5 and 6 show schematically an alternative aerofoil which is adjustable between a high profile configuration and a low profile configuration. Many of the parts illustrated in FIGS. 5 and 6 may be found in the earlier figures, and like reference numerals are used to represent like parts.

It will be noted that only a single Coanda blowing slot 14' is utilised in this adjustable profile aerofoil. The position of this Coanda blowing slot 14' is between the two blowing slots 14, 16 shown in the aerofoil of FIG. 1. However, one or two Coanda blowing slots may be used, depending on the performance required. The aerofoil may have two slots arranged in a similar manner to the aerofoil in FIG. 1.

The upper surface 13 of the aerofoil shown in FIGS. 5 and 6 is constituted by a leading surface portion and a trailing surface portion which are defined by an upper leading panel 15 and an upper trailing panel 17 respectively. The lower surface 12 is constituted by a lower leading panel 60, a lower central panel 61, and a lower trailing panel 62. The lower leading panel 60 is connected to the lower central panel 61 via a hinge 63, and the lower trailing panel 62 is connected to the lower central panel 61 via a hinge 64. The hinges 63, 64 are located towards the leading edge 10 and the trailing edge 11 respectively, so that the lengths of the lower leading panel and lower trailing panel are significantly less than the length of the lower central panel. The lower central panel 61 includes a transverse bend 65 which defines a lower central panel leading portion 66 and a lower central panel trailing portion 67.

The upper leading panel 15 and lower leading panel 60 are fixedly attached at the leading edge 10, and the upper trailing panel 17 and lower trailing panel 62 are fixedly attached at the trailing edge 11. The upper leading panel 15 includes the gas discharge slot 14'. The upper trailing panel 17 is detachably attached to the remainder of the upper surface via a sliding lap joint 68 positioned rearwardly of the gas discharge slot 14'. The sliding lap joint 68 includes a roller 69 rotatably mounted to the upper trailing panel 17 which slidably moves in a curved channel 70 which extends rearwardly from adjacent to the gas discharge slot 14'. Alternatively the sliding movement of the lap joint 68 could be provided by means other than the roller in the curved channel if desired.

The aerofoil includes a pair of supports 71, 72 which are the main supporting beams for structurally connecting the aerofoil to an aircraft. The supports 71, 72 are attached to the inner surfaces of the lower central panel leading portion 66 and the lower central panel trailing portion 67 respectively. The aerofoil includes a hydraulic jack 73 pivotally connected to the inside of the upper leading panel 15 and the support 71. A further hydraulic jack 74 is pivotally connected to the inside of the upper trailing panel 17 and the support 72. These jacks serve to move the respective leading panels and trailing panels about the hinges 63, 64.

The aerofoil additionally includes lower profile supports 75, 76 which are located between the supports 71, 72 and the leading and trailing edges 10, 11 respectively.

When the aerofoil is to be adjusted from the high profile configuration shown in FIG. 5 to the low profile configuration shown in FIG. 6, the front hydraulic jack 73 is actuated to move the upper leading panel 15 downwards toward the lower central panel 61. The rearward hydraulic jack 74 is actuated concurrently to cause the upper trailing panel 17 to move downwards toward the lower central panel 61. The movement of the roller 69 in the curved channel 70 results in a suitable wing configuration being retained throughout the movement.

When the aerofoil is in the low profile configuration shown in FIG. 6, the lower leading panel 60 is aligned with the lower central panel leading portion 66, and the lower trailing panel 62 is aligned with the lower central panel trailing portion 67. Further, in the low profile configuration, the curved channel 67 is located inside the aerofoil between the upper trailing panel 17 and the lower central panel 61.

This form of aerofoil is suitable for use as an aircraft wing. The high profile configuration shown in FIG. 5 is suitable as a high lift subsonic aerofoil wing needed for taking off and landing. Once the speed of the aircraft increases, the wing can then close down in to the low profile configuration shown in FIG. 6. This configuration is suitable for supersonic or hypersonic flight, for example in a STOL hypersonic airliner or space relaunch vehicle. The aerofoil may be movably attached to an aircraft so that its overall angle of incidence to oncoming airflow is selectively variable. This may be achieved by movably mounting the main supports 71, 72 to an aircraft.

The gas need only be discharged through the slot 14' for a short period of time (generally in the order of about 7 seconds), as the take off time for a supersonic or hypersonic aircraft is very brief. Once the aircraft has accelerated along the runway, the gas can be discharged through the vent or slot 14' to produce a Coanda flow. This provides good lift properties to aid in the take off of the aircraft. The gas would only be applied for a few seconds until the aircraft had further accelerated. Once a speed approaching supersonic has been reached, the aerofoil would be adjusted into the low profile configuration as shown in FIG. 6.

Figure 7:
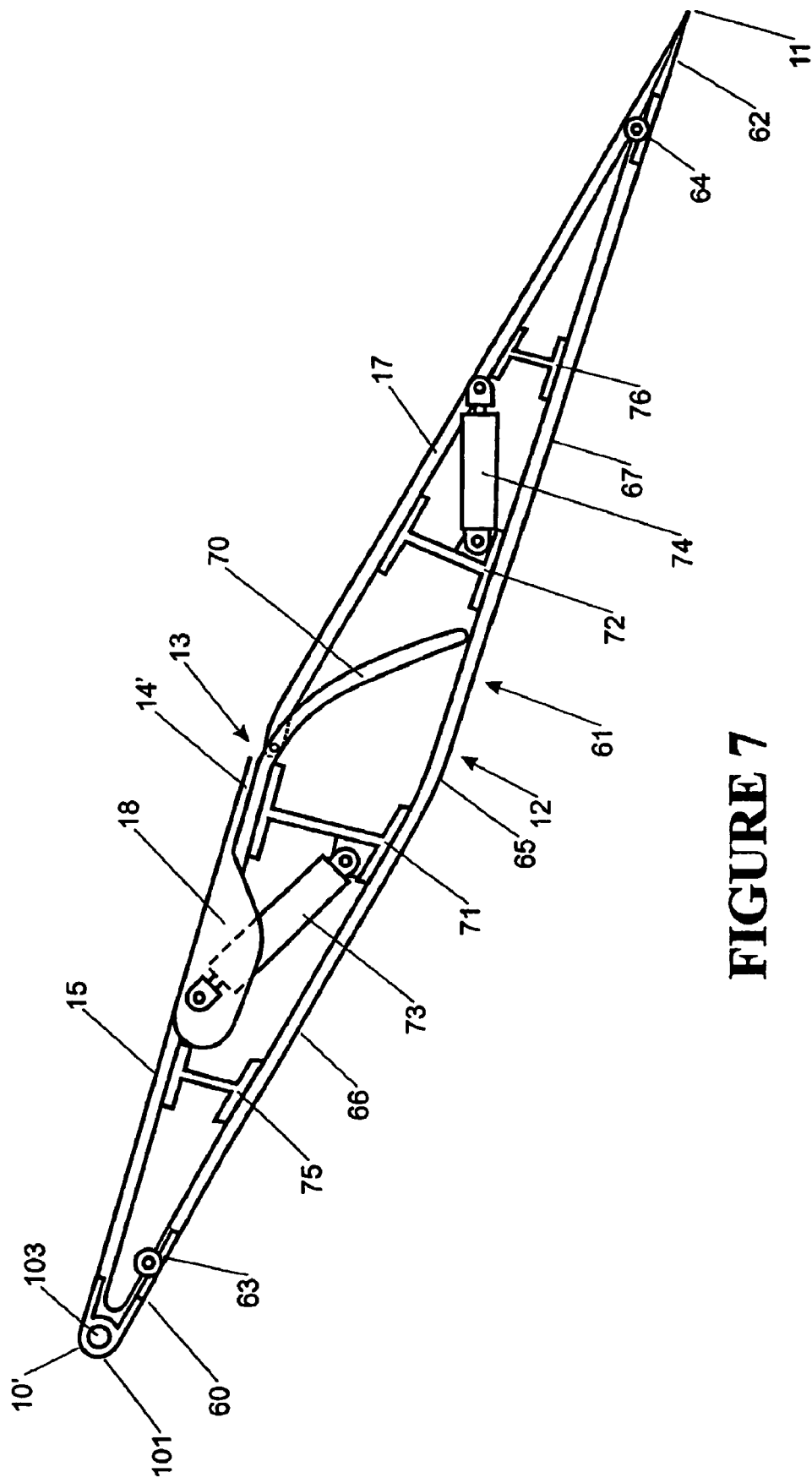
FIG. 7 shows a simplified cross-section of an aerofoil similar to that shown in FIG. 5, but with a rounded leading edge.

The aerofoil shown in FIG. 7 is similar to the aerofoil shown in FIGS. 5 and 6, and like reference numerals are used to indicate like parts. The details of this aerofoil adjacent the leading edge 10 differ from the aerofoil of FIGS. 5 and 6. The front end 10' includes a rounded portion 101 made of a ceramic or other high temperature resistant material. This high temperature resistant material extends back along the upper and lower leading panels a predetermined distance from the leading edge 10' of aerofoil. The curved portion 101 includes a section through which cooling fluid such as gas or helium may pass to cool the leading edge of the aerofoil. The section is preferably in the form of a pipe 103.

This form of aerofoil is again suitable for use as an aircraft wing, and more particularly for use as a wing of a space relaunch vehicle. Such vehicles must reach speeds of approximately seven times the speed of sound to get into orbit, and at such speeds the leading edge of the aerofoil is exposed to very high temperatures. High temperatures are also encountered during re-entry into the atmosphere. The curved front edge lowers stress concentrations in the leading edge of the aerofoil, and also enables cooling fluid or gas to be passed therethrough to cool the leading edge.

An advantage of using the aerofoil of FIGS. 5, 6 or 7 as a wing is that the aircraft can take off and land at lower speed than an aircraft which has a non-variable low profile wing. This reduces the necessary power for take off. Further, there will be reduced load and wear on tires and undercarriage during landing, as an aircraft utilizing such an aerofoil will be able to land at a speed of approximately 100 miles per hour (44.7 metres per second) as opposed to one having a conventional non-adjustable low profile wing which may require a landing speed of 350 miles per hour (156.5 metres per second). Therefore the tires on an aircraft having a preferred variable cross-section aerofoil as a wing will not be required to spin up to such a high speed upon landing.

The Coanda blowing slot 14' shown in the aerofoils of FIGS. 5, 6 and 7 may include a plurality of spaced apertures or nozzles, and the apertures or nozzles may include substantially V-shaped notches in their side walls.

Figure 8C:
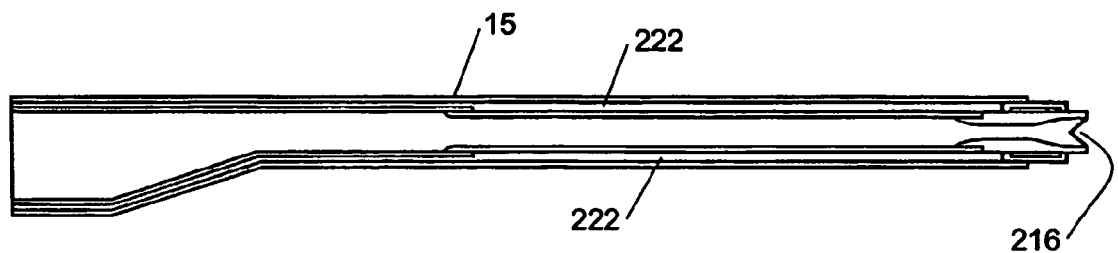
FIG. 8 shows (a) an end view, (b) a sectional plan view, and (c) a sectional side view of a preferred Coanda blowing nozzle arrangement.

One preferred arrangement of spaced nozzles is shown in FIG. 8. As can be seen from the plan view in FIG. 8b, the nozzle arrangement is indicated generally by reference numeral 200 and includes a plurality of spaced nozzles 202 which are spread across a portion of the upper leading panel 15 of the aerofoil and are located underneath the upper leading panel 15. A tube 204 extends from each nozzle 202, the tubes 204 converging into a tapering section 206 of the nozzle arrangement. The tapering section 206 terminates in a tubular portion 208 which may be connected to a combustion chamber such as that shown schematically in side elevation in FIG. 9. In plan view each nozzle 202 has a converging region 210 adjacent the tube 204, a throat 212 adjacent the converging region 210, and a diverging outlet portion 214. The maximum included angle in the diverging outlet portion is about 24° or less. In side elevation view as shown in FIG. 8c, the shape of the nozzles is similar, although it will be seen that a substantially V-shaped notch is provided in each side wall. It has been found that such nozzle shapes result in desirable characteristics.

Figure 9:
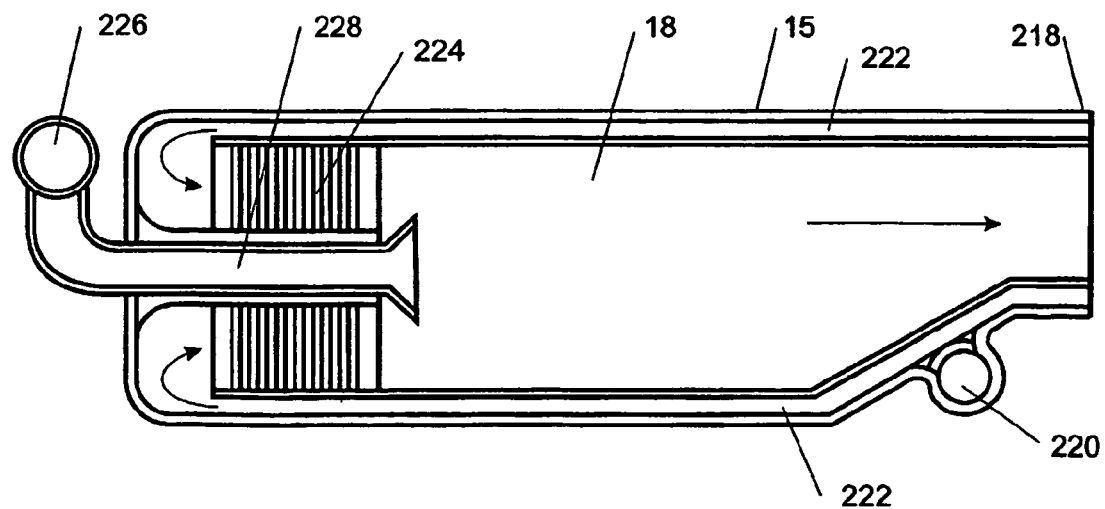
FIG. 9 shows a schematic sectional elevation view of a preferred combustion chamber which may be attached to the Coanda blowing nozzle arrangement of FIG. 8.

As outlined above, in a preferred embodiment a rocket combustion chamber is provided to blow gas through the nozzle arrangement. With reference to FIG. 9, a preferred embodiment combustion chamber 18' is attached to the tubular portion 208 of the nozzle arrangement by a throat section 218. The combustion chamber includes a source 220 of oxidant which is preferably concentrated hydrogen peroxide with a strength of 80-90% (known as high-test peroxide). The high-test peroxide is pumped through a channel 222 which acts as a cooling jacket and surrounds the combustion chamber 18, and is delivered through a catalyst 224 such as silverplated nickel gauze into the combustion chamber 18'. The cooling jacket 222 extends into the nozzle arrangement as can be seen from FIGS. 8b and 8c. This cools the external surface of the aerofoil as the high-test peroxide is passed therethrough. The cooling jacket 222 also serves to transfer heat from within the combustion chamber 18 to the high-test peroxide prior to its entry into the combustion chamber.

A pump is provided to pump fuel such as kerosene into the combustion chamber 18 via a tube 228. The thrust provided by the rocket is variable by changing the amount of fuel pumped into the combustion chamber 18.

If desired, a plurality of combustion chambers 18 and associated nozzle arrangements may be provided across each aerofoil.

The flow of heated gas is turbulent at the converging region 210 of each nozzle adjacent the tube. The throat 212 determines the rate of volume flow of gas through the nozzle. The diverging outlet portion 214 of each nozzle allows the gas to expand and provide thrust on the nozzle. The V-shaped notch in each sidewall enables the flow to fan out or disperse in a horizontal plane, to adjoin the flow from neighboring nozzles, assisting in attachment of the Coanda flow over the aerofoil surface. As the flow fans out in the horizontal plane, it tapers down in the vertical plane.

Rather than providing a single combustion chamber feeding gas to a plurality of nozzles, each nozzle may comprise part of an individual rocket combustion chamber. For example, any number of small rocket combustion chambers may be provided along the span of the aerofoil to provide for the same number of Coanda blowing nozzles.

Figure 10:
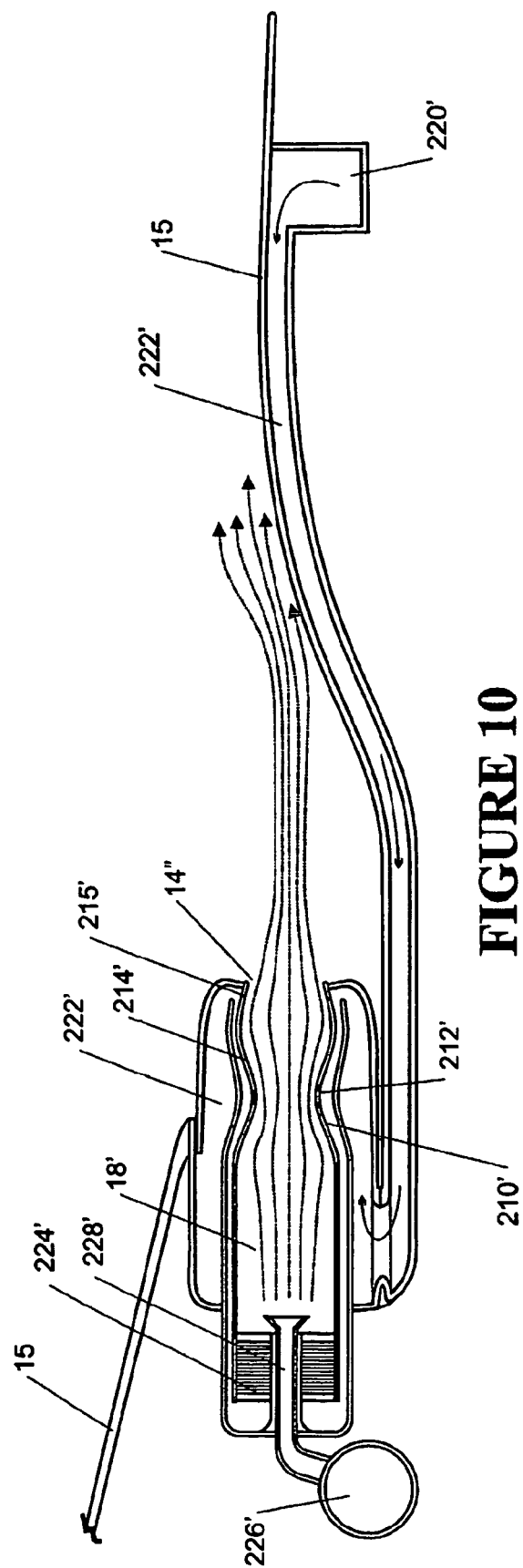
FIG. 10 shows a schematic sectional elevation view of an alternative combustion chamber, in which each chamber provides a blowing nozzle.
Figure 11:
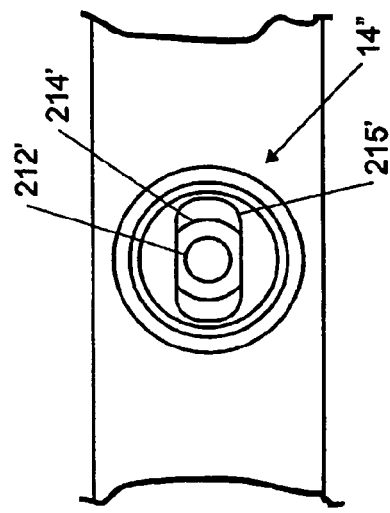
FIG. 11 shows a schematic end view of a nozzle of the combustion chamber of FIG. 10.

Such an arrangement is shown in FIGS. 10 and 11. Similar reference numerals are used to indicate similar parts to FIGS. 8 and 9. This embodiment differs in that, rather than providing a separate nozzle arrangement, each nozzle is provided as part of an individual rocket combustion chamber. The nozzles may again be in the order of 8 mm diameter. Further, rather than including V-shaped notches, the outlets of the nozzles are low profile to fan out the exhaust gas.

Each nozzle includes a converging region 210' adjacent the interior of the combustion chamber, and a narrowed throat region 212'. A diverging region 214' is again provided adjacent the throat region 212', but the diverging region 214' is followed by a further region 215' which converges in the vertical plane. In the horizontal plane the region 215' diverges at an included angle of about 32° or less, to provide a nozzle outlet which is wider than it is high. This again serves to fan out or disperse the exhaust gas in the horizontal plane and taper the exhaust gas in the vertical plane. With a number of such combustion chambers provided side-by-side, the gas from each nozzle 14" will attach to the gas from the neighboring nozzle.

Attachment of the Coanda flow to the wing surface is enhanced by virtue of the combustion chamber and nozzle 14" being recessed under the aerofoil surface or leading panel 15, and the aerofoil surface following the nozzle 14" being angled such that the exhaust gas flows directly onto the surface. It will be appreciated that the exhaust gas will be at a high temperature, and the surface following the nozzle 14" is curved to allow for thermal expansion. Further, the channel 222' again serves to cool the aerofoil surface as the oxidant is passed therethrough.

While this nozzle arrangement differs from that of FIGS. 8 and 9, it will be appreciated that they both assist in attaching the Coanda flow to the aerofoil surface.

Test Results

Test results have shown that providing Coanda blowing slots near the upper most position on the aerofoil's front face provided reduced negative lift from the Coanda blowing jet reaction, as well as providing additional forward thrust, with good entrainment for forward thrust when reattaching the leading edge breakaway flow.

The Coanda adhesion effect changes the direction of the Coanda blowing, causing it flow around over the aerofoil causing an external resultant force which creates lift on the aerofoil.

Tests on an aerofoil of eight foot (2.624 metres) chord length and one foot (0.3048 metres) span gave 60 lbs (266.89 Newtons) lift, from a blowing pressure of 300 lbs per square inch (2067 kilopascals) and gave 37 lbs (164.58 Newtons) of forward thrust with no main air flow.

As the Coanda blowing pressure was increased, lift on the aerofoil was found to increase. This is due to the normal main air flow passing over the aerofoil being entrained and reattached and thrust downward together with the flow from the Coanda blowing nozzle. As the Coanda blowing temperature was increased, using a jet engine combustion system, the velocity also increased. This resulted in the small increase in forward thrust but no increase in lift. The increased temperature however usefully increased the volume of a given amount of compressed air, thereby increasing the blowing duration from the given amount of compressed air by a factor of 2.4.

The main function of the Coanda blowing nozzles is to reattach the leading edge breakaway flow by boundary layer control to the aerofoil. The Coanda blowing provides both forward thrust and lift on the aerofoil, which improves the economics of the aerofoil. Further, the extra Coanda blowing power to the boundary layer control system provides a higher coefficient of lift for the aerofoil. The preferred aerofoil in the subsonic (higher profile) configuration is a relatively deep aerofoil having a thickness of about 30% of the chord length. With Coanda blowing it is capable of operating at a high incidence of greater than about 22°, giving a high coefficient of lift at landing and takeoff speed.

Wind tunnel tests were performed on an aerofoil having a 6" (0.152 metre) chord length and 9" (0.228 metre) span width, as well as an aerofoil having a 1' (0.3048 metre) chord length and 9" (0.228 metre) span width, to provide the following results:

| Main Air Flow Velocity | Percentage of Lift due to Main Air Flow | Percentage of Lift due to Coanda Effect |
| --- | --- | --- |
| 100 ft/sec (30.48 m/sec) | 50% | 50% |
| 240 ft/sec (73.51 m/sec) | 66% | 34% |
| 350 ft/sec (106.68 m/sec) | 75% | 25% |

The above results are from compressed air Coanda blowing only, at limited pressure.

The coefficient of lift decreased as the main airflow velocity increased, because the Coanda blowing power remains constant. Larger chord aerofoils enable an increased radius on the curved upper surface of the aerofoil which allows for increased Coanda blowing pressure and hence more lift due to the Coanda blowing effect.

The above describes preferred embodiments of the present invention, and modifications may be made thereto without departing from the scope of the following claims.

I claim:

1. An aerofoil having a chord length and a depth and which is adjustable between a high profile configuration for subsonic flow and a low profile configuration for supersonic flow, the aerofoil having an initial angle of attack to oncoming airflow of at least about 22 degrees, the aerofoil including a leading edge which generates a subsonic leading edge breakaway flow in the high profile configuration that comes from beneath the leading edge, an upper surface having a leading portion inclined away from the leading edge and a trailing portion rearward of the leading portion, a lower surface, and a trailing edge, wherein in the high profile configuration the depth of the aerofoil is at least about 30% of the chord length of the aerofoil so that the aerofoil is effective to reattach the leading edge breakaway flow and enables the aerofoil to operate with the initial angle of attack of at least about 22 degrees, and at least one opening provided along the leading portion of the upper surface and arranged to discharge a sufficient volume of gas away from the leading edge to reattach the leading edge breakaway flow to the upper surface.

2. An aerofoil according to claim 1, wherein the opening is in the form of a slot.

3. An aerofoil according to claim 1, wherein the openings comprise a series of apertures or nozzles spaced along the leading portion of the upper surface.

4. An aerofoil according to claim 3, wherein the apertures or nozzles are arranged to disperse the gas over the surface of the aerofoil.

5. An aerofoil according to claim 4, wherein the apertures or nozzles include substantially V-shaped apertures in their side walls.

6. An aerofoil according to claim 4, wherein the width of the outlet of each nozzle or aperture is greater than its height.

7. An aerofoil according to claim 1, wherein the upper leading surface portion is constituted by an upper leading panel and the upper trailing surface portion is constituted by an upper trailing panel.

8. An aerofoil according to claim 7, wherein the upper trailing panel is detachably joined to the remainder of the upper surface to facilitate movement between the high profile configuration and the low profile configuration.

9. An aerofoil according to claim 8, wherein the detachable joint is in the form of a sliding lap joint.

10. An aerofoil according to claim 9, wherein the sliding lap joint includes a roller rotatably mounted to the upper trailing panel which is slidable in a curved channel extending from the upper leading panel.

11. An aerofoil as claimed in claim 7, wherein the upper trailing panel is substantially planar.

12. An aerofoil according to claim 1, wherein the lower surface is defined by a leading panel, a central panel, and a trailing panel.

13. An aerofoil according to claim 12, wherein the lower leading panel and the lower trailing panel are hingedly connected to the lower central panel.

14. An aerofoil according to claim 12, wherein the lower central panel includes a transverse bend which defines a lower central panel leading portion and a lower central panel trailing portion.

15. An aerofoil according to claim 12, and including an upper leading panel, wherein the upper leading panel is fixedly attached to the lower leading panel at the leading edge.

16. An aerofoil according to claim 12, and including an upper trailing panel, wherein the upper trailing panel is fixedly attached to the lower trailing panel at the trailing edge.

17. An aerofoil according to claim 12, wherein the lengths of the lower leading panel and the lower trailing panel are significantly less than the length of the lower central panel.

18. An aerofoil according to claim 1, wherein the aerofoil includes two internal hydraulic jacks to facilitate adjustment between the low profile configuration and the high profile configuration.

19. An aerofoil according to claim 1, including two main structural support beams extending longitudinally of the aerofoil.

20. An aerofoil according to claim 1, wherein the leading edge is rounded.

21. An aerofoil according to claim 20, wherein the rounded leading edge includes a section through which cooling fluid or gas may pass to cool the leading edge.

22. An aerofoil according to claim 20, wherein the portion of the aerofoil adjacent to and including the leading edge includes a high temperature resistant layer.

23. An aerofoil according to claim 22, wherein the high temperature resistant layer comprises a ceramic material.

24. An aerofoil according to claim 1, including means to heat the gas.

25. An aerofoil according to claim 24, wherein the means to heat the gas comprises a combustion chamber within the aerofoil.

26. An aerofoil according to claim 25, wherein the means to heat the gas is a rocket chamber provided within the aerofoil which is arranged to exhaust heated gas to the opening(s).

27. An aerofoil according to claim 26, wherein the openings comprise a plurality of nozzles, and an arrangement is provided to exhaust heated gas from the rocket chamber to at least some of the plurality of nozzles.

28. An aerofoil according to claim 26, including one or more rocket chambers, with each opening comprising part of a respective rocket chamber.

29. An aerofoil according to claim 24, including means to heat the gas adjacent to but in operable connection with, the aerofoil.

30. An aerofoil according to claim 1, wherein at least one further opening is provided along a region of the upper surface between the opening(s) along the leading portion of the upper surface and the trailing edge, to discharge gas towards the trailing edge.

31. An aerofoil according to claim 30, wherein the further opening is in the form of a slot.

32. An aerofoil according to claim 30, wherein the further openings comprise a plurality of apertures or nozzles arranged along the trailing surface portion of the upper surface.

33. An aerofoil according to claim 32, wherein the apertures or nozzles in the trailing surface portion are arranged to disperse the gas over the trailing surface portion of the aerofoil.

34. An aerofoil according to claim 33, wherein the apertures or nozzles in the trailing surface portion include substantially V-shaped apertures in their side walls.

35. An aerofoil according to claim 33, wherein the width of the outlet of each aperture or nozzle in the trailing surface portion is greater than its height.

36. An aerofoil according to claim 1, wherein the aerofoil is a wing.

37. An aerofoil according to claim 36, which is movably attached to an aircraft such that its angle of incidence relative to a fuselage is selectively variable.

38. An aerofoil according to claim 1, wherein substantially the entire chord length of the upper and lower surfaces move relative to one another when the aerofoil is adjusted between the high profile and low profile configuration.

39. An aerofoil having an initial angle of attack to oncoming airflow of at least about 22 degrees; a profile including a chord length and a depth, wherein the depth of the aerofoil is at least about 30% of the chord length of the aerofoil, the profile being such that a leading edge of the aerofoil generates a subsonic leading edge breakaway flow that comes from beneath the leading edge; a substantially continuous upper surface having a leading portion inclined away from the leading edge, and a trailing portion angled toward a trailing edge; a lower surface; and at least one opening provided in the leading portion of the upper surface and arranged to discharge gas away from the leading edge with the profile of the aerofoil being effective and the discharged gas being of sufficient volume to reattach the leading edge, breakaway flow to the upper surface, the profile further being such that the aerofoil is able to operate with the initial angle of attack of at least about 22 degrees.

40. An aerofoil as claimed in claim 39, further comprising at least one further opening along a region of the upper surface between the openings along the leading portion of the upper surface and the trailing edge, to discharge gas towards the trailing edge.

41. A rotor assembly comprising:
a central support;
a rotor including a plurality of radially oriented aerofoils distributed circumferentially around the central support; and
gas supply means which carries pressurized gas from the central support to the aerofoils, wherein at least a majority of the aerofoils are as claimed in claim 39.

42. A rotor assembly as claimed in claim 41, wherein each of said at least a majority of the aerofoils further comprises at least one further opening along a region of the upper surface between the openings along the leading portion of the upper surface and the trailing edge, to discharge gas towards the trailing edge.

* * * * *